United States Patent
Iarocci et al.

(10) Patent No.: US 10,549,863 B2
(45) Date of Patent: Feb. 4, 2020

(54) ACTUATED OUTLET DOOR FOR AIRCRAFT HIGH-TEMPERATURE EXHAUST

(71) Applicant: BOMBARDIER INC., Dorval (CA)

(72) Inventors: Nick Iarocci, Laval (CA); Reza Sadri, Kirkland (CA); Vincent Poirier, Montreal (CA); Kathleen Dussault, Laval (CA); Edmond Boileau, Montreal (CA)

(73) Assignee: BOMBARDIER INC., Dorval (CA)

( * ) Notice: Subject to any disclaimer, the term of this patent is extended or adjusted under 35 U.S.C. 154(b) by 396 days.

(21) Appl. No.: 15/504,403

(22) PCT Filed: Jul. 29, 2015

(86) PCT No.: PCT/IB2015/055735
§ 371 (c)(1),
(2) Date: Feb. 16, 2017

(87) PCT Pub. No.: WO2016/027187
PCT Pub. Date: Feb. 25, 2016

(65) Prior Publication Data
US 2017/0233091 A1   Aug. 17, 2017

Related U.S. Application Data

(60) Provisional application No. 62/039,648, filed on Aug. 20, 2014.

(51) Int. Cl.
*B64D 33/04* (2006.01)
*B64D 33/08* (2006.01)
*B64D 15/04* (2006.01)

(52) U.S. Cl.
CPC ............. *B64D 33/04* (2013.01); *B64D 15/04* (2013.01); *B64D 33/08* (2013.01)

(58) Field of Classification Search
CPC ........ B64D 29/00; B64D 29/06; B64D 33/04; B64D 2033/024; B64C 7/02
See application file for complete search history.

(56) References Cited

U.S. PATENT DOCUMENTS

| 4,825,644 A | 5/1989 | Bubello et al. |
| 4,899,960 A | 2/1990 | Hararat-Tehrani et al. |

(Continued)

FOREIGN PATENT DOCUMENTS

| EP | 0953506 A2 | 11/1996 |
| EP | 2392509 A1 | 12/2011 |

(Continued)

OTHER PUBLICATIONS

The State Intellectual Property Office of the People's Republic of China, Notification of First Office Action dated May 16, 2018 re: Application No. 2201580043947.3.

(Continued)

*Primary Examiner* — Richard G Davis
(74) *Attorney, Agent, or Firm* — Norton Rose Fulbright Canada LLP

(57) ABSTRACT

An outlet door is provided for covering an outlet defining an outlet area in a skin (24) of an aircraft component to exhaust a flow of heated air to an outside of the aircraft. The outlet door includes a body defining a door area and extending between a leading edge and a trailing edge and a linkage (38) connecting the body to the aircraft, permitting the body to transition between at least one of an open position and a closed position. In the closed position, the body at least partially occupies the outlet area. In the open position, the body forms an angle with the skin of the aircraft. The leading edge of the body and the skin of the aircraft define a separation (202) therebetween when the body is in the open (Continued)

position. The separation defines and air flow for mixing cold air with the flow of heated air.

13 Claims, 23 Drawing Sheets

(56) References Cited

U.S. PATENT DOCUMENTS

| | | | |
|---|---|---|---|
| 5,137,230 | A | 8/1992 | Coffinberry |
| 5,213,286 | A * | 5/1993 | Elliott ................ B64D 29/06 16/368 |
| 5,368,258 | A | 11/1994 | Johnson et al. |
| 6,702,232 | B2 | 3/2004 | Dovey et al. |
| 2007/0245739 | A1 | 10/2007 | Stretton et al. |
| 2007/0278345 | A1 | 12/2007 | Oberle et al. |
| 2008/0053101 | A1 | 3/2008 | Schwarz |
| 2009/0007567 | A1 | 1/2009 | Porte et al. |
| 2010/0124875 | A1 | 5/2010 | Stevens et al. |
| 2010/0303616 | A1 | 12/2010 | Chir et al. |
| 2011/0214747 | A1 | 9/2011 | Le Docte |
| 2011/0297787 | A1 * | 12/2011 | Guillaume ............ B64D 29/06 244/129.4 |
| 2012/0125010 | A1 * | 5/2012 | Michael ................ B64C 7/02 60/782 |
| 2012/0126061 | A1 | 5/2012 | Raposeiro et al. |
| 2012/0216545 | A1 | 8/2012 | Sennoun et al. |
| 2014/0000279 | A1 | 1/2014 | Brousseau et al. |

FOREIGN PATENT DOCUMENTS

| | | |
|---|---|---|
| FR | 851422 A | 1/1940 |
| FR | 2920146 A1 | 2/2009 |
| GB | 478935 A | 1/1938 |
| GB | 1207194 | 9/1970 |
| WO | 2012125895 A1 | 9/2012 |

OTHER PUBLICATIONS

PCT international Search Report and Written Opinion dated Oct. 14, 2015 re: International Application No. PCT/IB2015/055735.
English translation of European patent No. 2392509 dated Dec. 7, 2011; www.google.com/patents . . . .
English translation of France patent document No. 851422 dated Jan. 9, 1940; www31.orbit.com/questel/ . . . .
English translation of France patent No. 2920146 (Application No. 2007FR-0005920) dated Feb. 27, 2009; www31.orbit.com/questel/ . . . .
European Patent Office, Communication pursuant to Article 94(3) EPC dated Dec. 8, 2017 on corresponding EP Application No. 15 749 890.8.

* cited by examiner

ACTUATED OUTLET DOOR FOR AIRCRAFT HIGH-TEMPERATURE EXHAUST

CROSS-REFERENCE TO RELATED APPLICATION(S)

This application is a national phase application under 35 U.S.C. 371 of International Patent Application No. PCT/IB2015/055735 filed on Jul. 29, 2015, which claims priority from U.S. Provisional Patent Application Ser. No. 62/039,648 filed on Aug. 20, 2014, the entire content of which is incorporated herein by reference.

FIELD OF THE INVENTION

The present invention concerns an actuated door for an aircraft high-temperature exhaust outlet. More specifically, the present invention concerns the construction of an exhaust door that facilitates exhaustion of hot gases from, for example a jet engine pre-cooler, while minimizing the impact of the exhaustion of the hot gases on the aerodynamic and/or thermal properties of the aircraft.

DESCRIPTION OF THE RELATED ART

In the prior art, there are examples of operation of aircraft pre-coolers, which might generate heated gases that must be exhausted therefrom.

One example may be found in PCT Publication WO 2012/0125895, which published on Sep. 20, 2012, and is entitled "System and Method for Operating a Precooler in an Aircraft." This particular reference concerns the operation of a precooler and associated elements.

The known apparatuses, methods, and systems, however leave room for improvement.

SUMMARY OF THE INVENTION

The present invention addresses one or more of the deficiencies noted with respect to the prior art.

The present invention allows the exhaustion of hot gas from, for example, a jet engine pre-cooler by providing required pressure differential between a region inside the exhaust duct and a region exterior to the exhaust duct outlet opening exposed to incoming free stream, while reducing thermal footprint of the hot exhaust on the aircraft skin.

The present invention may also reduce aircraft drag through an articulated door which only opens when required.

It is, therefore, one aspect of the present invention to provide an outlet door for covering an outlet defining an outlet area in a skin of an aircraft component to exhaust a flow of heated air to an outside of the aircraft. The outlet door includes a body defining a door area and extending between a leading edge and a trailing edge and a linkage connecting the body to the aircraft, permitting the body to transition between at least one of an open position and a closed position. In the closed position, the body at least partially occupies the outlet area. In the open position, the body forms an angle with the skin of the aircraft. The leading edge of the body and the skin of the aircraft define a separation therebetween when the body is in the open position. The separation defines and air flow for mixing cold air with the flow of heated air.

In one contemplated embodiment, the body forms a low pressure zone that pulls the flow of heated air out of the exhaust door when the body is in the open position.

In another contemplated embodiment, when the body is in the open position, the body and the separation cooperate to pull the flow of heated air out of the exhaust door and to mix the cold air with the flow of heated air.

It is contemplated that the low pressure zone will form downstream of the body.

Still further, the low pressure zone may form adjacent to a lower surface of the body.

In one contemplated embodiment, the linkage connects to the body rearward of the leading edge of the body.

In another contemplated embodiment, the outlet door also includes at least one opening defined by the body when in the closed condition, wherein at least one opening establishes an opening area. The opening area is contemplated to be less than the outlet area.

The at least one opening may be defined by a difference between the door area and the outlet area, such that a gap forming the at least one opening is established between the body and the outlet. The gap may extend between the first side edge and the second side edge between the leading edge and the trailing edge.

The at least one opening may be a plurality of openings through the body.

A ratio of the opening area to the outlet area may be at least one of between about 10-20% of the outlet area, between about 12-18% of the outlet area, between about 14-16% of the outlet area, or about 15% of the outlet area.

In other contemplated embodiments, the angle to which the body is open with respect to the aircraft component is less than about at least one of 60, 55, 50, 45, 40, 35, 30, 25, 20, 15, 10, and 5 degrees In the outlet door of the present invention, the body may define a leading edge, a trailing edge, a first side edge, and a second side edge. The first side edge and the second side edge connect the leading edge to the trailing edge. A distance between the leading edge and the aircraft component, when the body is in the opened condition, may be less than 25% of an average length of at least one of the side edges.

Where openings are provided, the plurality of openings may be oblong, streamwise slots, circular, triangular, diamond-shaped, have dissimilar sizes, be non-linearly disposed through the body, and/or include a plurality of notches.

In one contemplated embodiment, the body is trapezoidally shaped. In another, the body is aerodynamically shaped.

Still further, a plurality of vortex generators may be provided on an interior surface of the body.

The outlet door alternatively may include side panels.

It is contemplated that the outlet opening is the terminus of an exhaust duct including a plurality of vanes.

Still further, the outlet opening is contemplated to be the terminus of an exhaust duct including a plurality of vortex generators.

In a further contemplated embodiment, the present invention provides an outlet door for covering an outlet defining an outlet area in a skin of an aircraft component to exhaust a flow of heated air to an outside of the aircraft. The outlet door includes a body defining a door area and extending between a leading edge and a trailing edge and a linkage connecting the body to the aircraft, permitting the body to transition between at least one of an open position and a closed position. In the closed position, the body partially occupies the outlet, establishing a gap defined by a difference between a door area and an outlet area. In the open position, the body forms an angle with the skin of the aircraft.

It is contemplated that the outlet door may form a low pressure zone that pulls the flow of heated air away from the skin of the aircraft when the body is in the open position.

It is contemplated that the door area is smaller than the outlet area.

In one contemplated embodiment, the gap precedes the leading edge of the body. In another, the gap follows the trailing edge of the body.

In an alternative, the gap is made of a plurality of notches in at least one of the leading edge or the trailing edge of the body.

Further aspects of the present invention will be made apparent from the paragraphs that follow.

BRIEF DESCRIPTION OF THE DRAWING(S)

The present invention will now be described in connection with the drawing appended hereto, in which.

Figure 21:
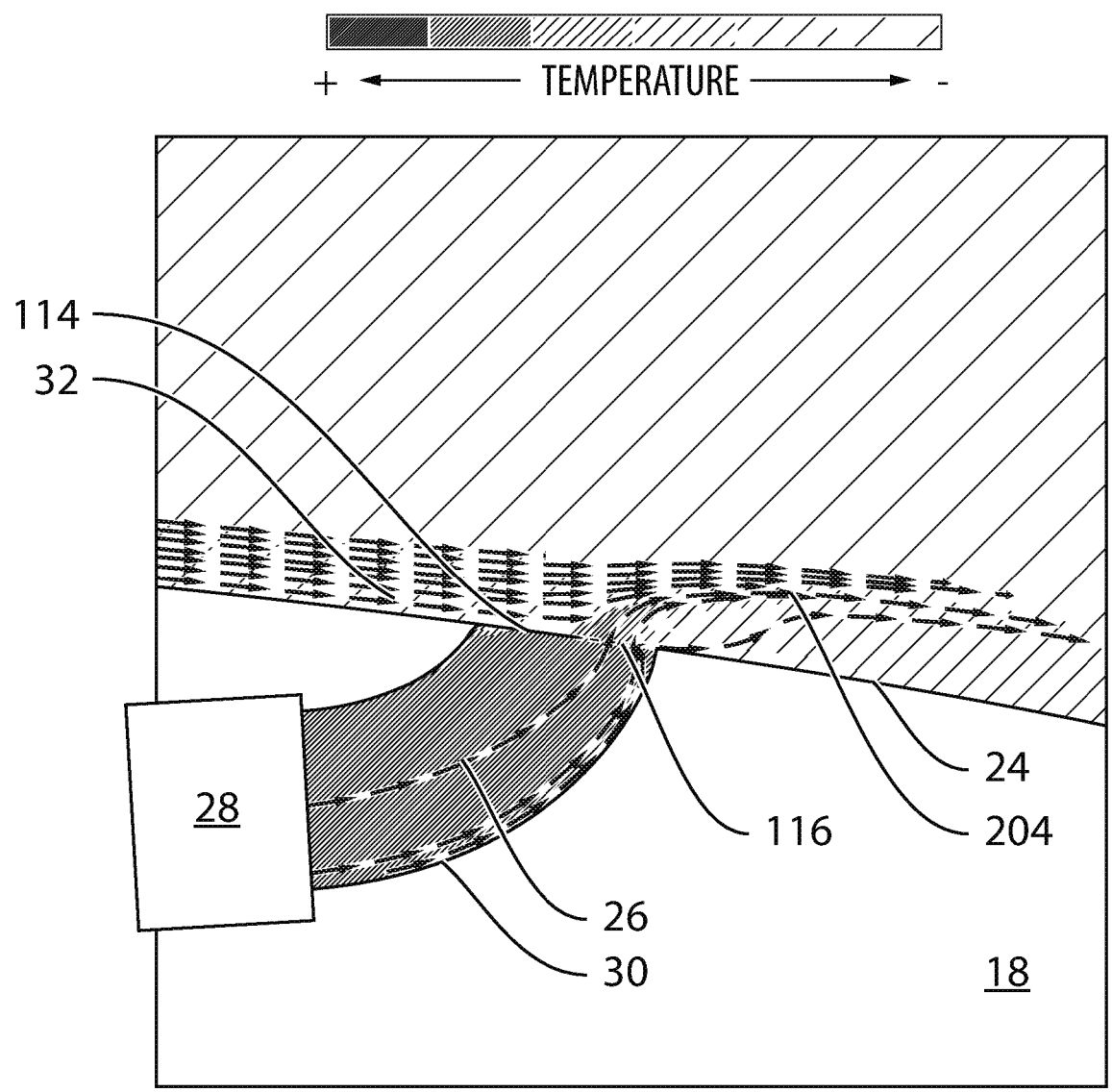
FIG. 21 is a graphical, cross-sectional illustration of the actuated door illustrated in FIG. 19, showing the flow of heated air from the exhaust duct when the actuated outlet door is in a closed condition.
Figure 22:
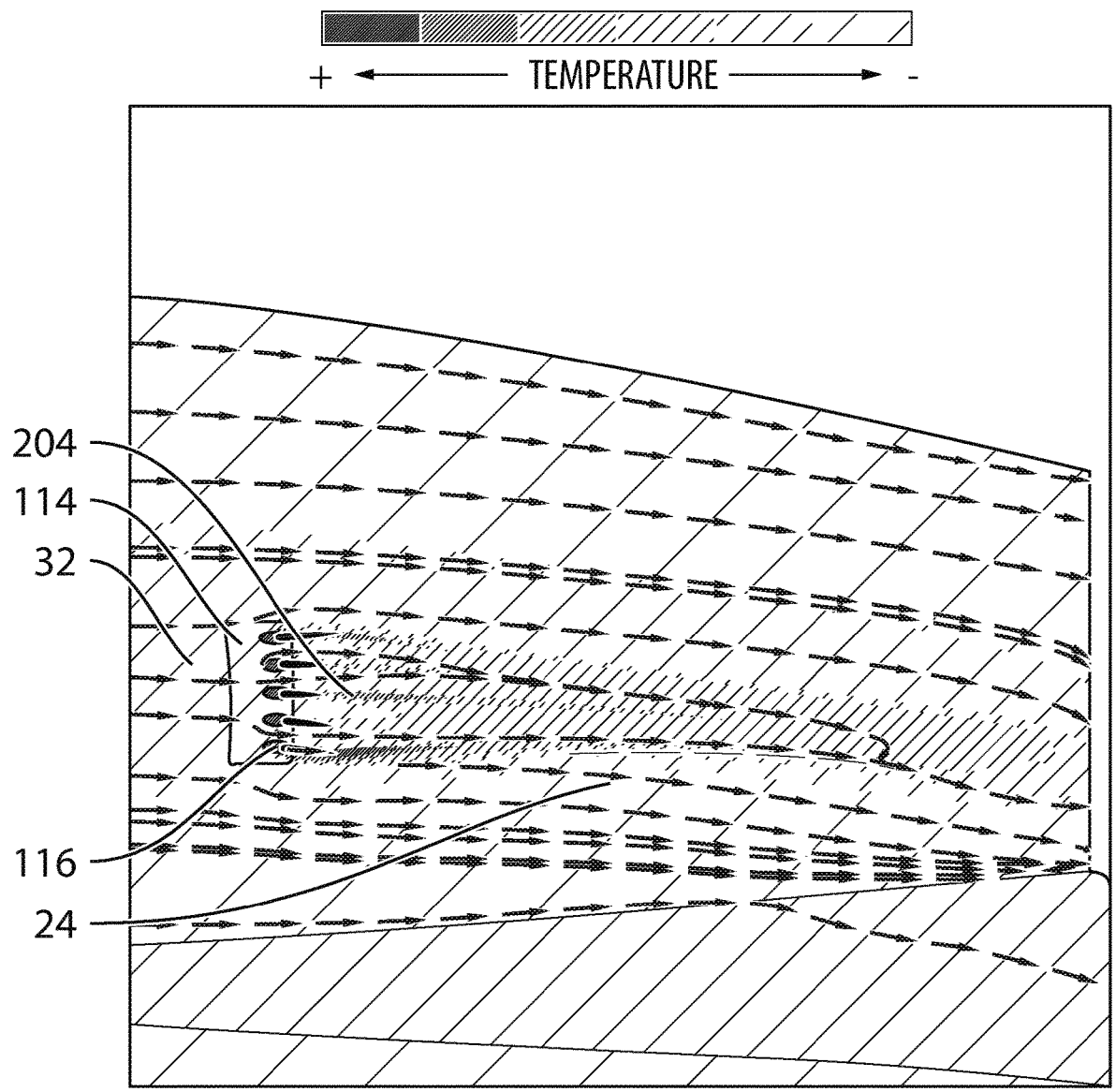
Figure 23:
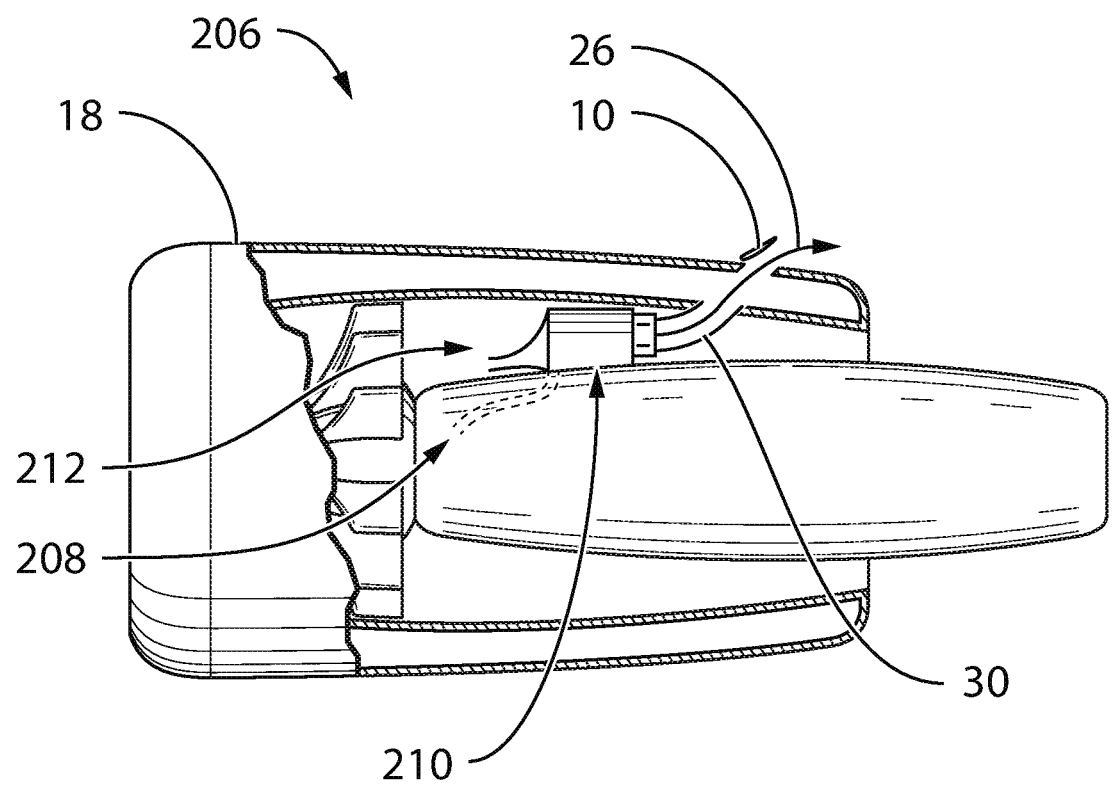

FIG. 22 is a graphical illustration of the exterior of the actuated outlet door shown in FIG. 21, showing the air flow and temperature pattern when the actuated outlet door is in the closed condition; and FIG. 23 is a graphical cross-section of an engine for an aircraft, illustrating an engine precooler that, in one embodiment, is contemplated to cooperate with the actuated outlet door of the present invention.

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

The present invention will now be discussed in the context of the construction of a jet aircraft with one or more jet engines. The present invention applies to any type of jet engine such as dual separate flow engines, mixed flow engines, etc. While the invention is discussed in this context, the present invention is not intended to be limited solely to the construction of jet aircraft. The present invention also is applicable to any other type of aircraft, as should be apparent to those skilled in the art. In addition, while discussed in the context of aircraft, the present invention may apply to vehicles other than aircraft.

While the invention will be described in conjunction with specific embodiments, it should be understood that the discussion of any one, particular embodiment is not intended to be limiting of the scope of the present invention. To the contrary, the specific, enumerated embodiments are intended to illustrate a wide variety of alternatives, modifications, and equivalents that should be apparent to those of ordinary skill in the art. The present invention is intended to encompass any such alternatives, modifications, and equivalents as if discussed herein.

In the following description, the same numerical references are intended to refer to similar elements. The re-use of reference numerals for different embodiments of the present invention is intended to simplify the discussion of the present invention. It should not be inferred, therefore, that the re-use of reference numbers is intended to convey that the associated structure is identical to any other described embodiment.

Although the preferred embodiments of the present invention as illustrated in the accompanying drawings comprise various components, and although the preferred embodiments of the system and corresponding parts of the present invention as shown consist of certain geometrical configurations as explained and illustrated herein, not all of these components and geometries are essential to the invention and, thus, should not be taken in their restrictive sense, i.e., should not be taken as to limit the scope of the present invention.

It is to be understood, as should be apparent to a person skilled in the art, that other suitable components and cooperations therebetween, as well as other suitable geometrical configurations may be used for a system according to the present invention, as will be briefly explained herein and as may be easily inferred therefrom by a person skilled in the art, without departing from the scope of the invention.

Additionally, it should be appreciated that positional descriptions such as "front," "rear," and the like are, unless otherwise indicated, to be taken in the context of the figures and should not be considered to be limiting of the present invention.

It will be appreciated that the present invention may be practiced without the specific details which have been set forth herein below in order to provide a thorough understanding of the invention.

Figure 1:
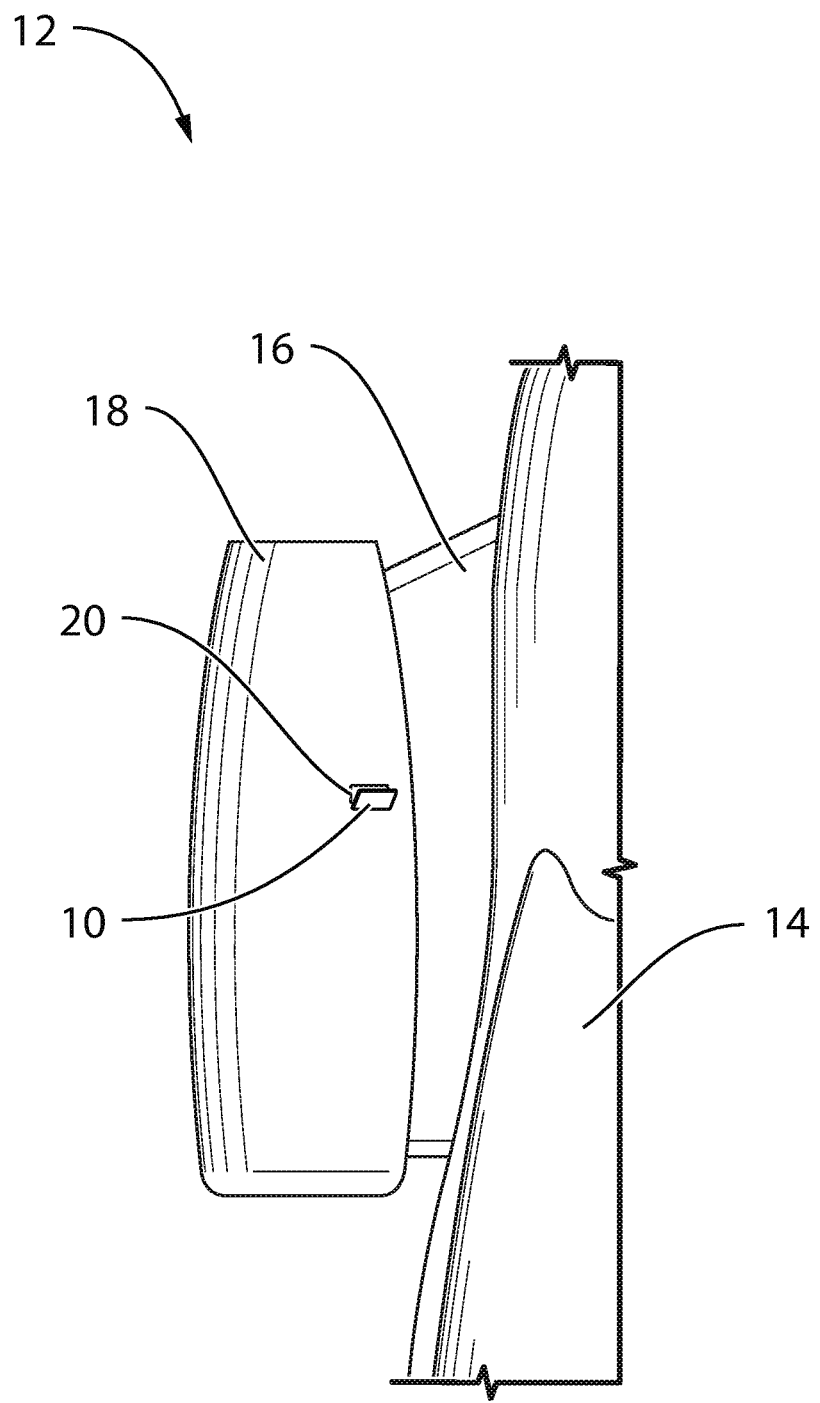
FIG. 1 is a partial, bottom view of an aircraft, illustrating one possible location for a first embodiment of an actuated outlet door, where the actuated outlet door is positioned on a nacelle of the aircraft.

FIG. 1 illustrates one contemplated location for the actuated outlet door 10 of the present invention. In this illustration, a portion of an aircraft 12 is shown. The aircraft 12 includes a fuselage 14, a pylon 16, and a nacelle 18. In FIG. 1, the location of the actuated outlet door 10 is on the nacelle 18, in association with an outlet opening 20. However, it is contemplated that the actuated outlet door 10 may be installed at any location on the aircraft 12 without departing from the scope of the present invention. To facilitate discussion of the present invention, the following discussion refers to the location of the actuated outlet door 10 as being on the nacelle 18. As noted, however, any discussion of this particular location should not be understood to be limiting of the present invention in any way.

Figure 2:
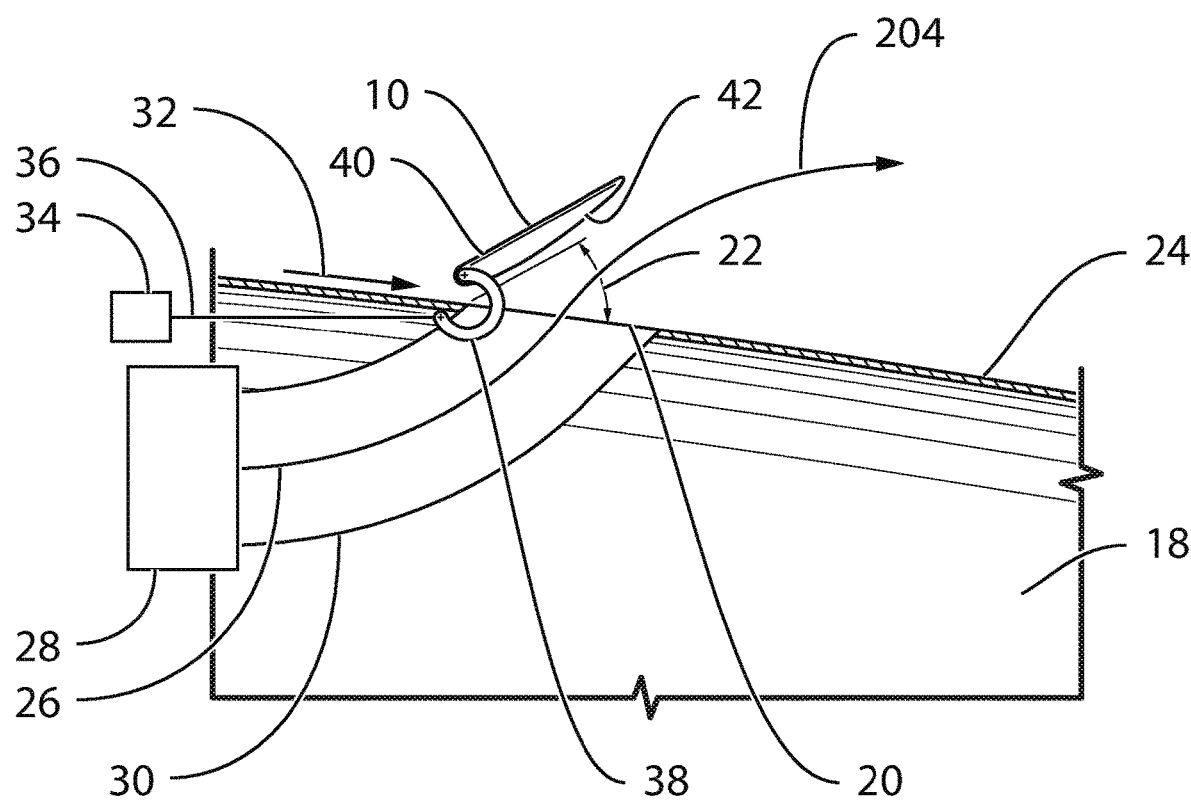
FIG. 2 is a graphical illustration showing details regarding a duct leading to the actuated outlet door illustrated in FIG. 1, where heated air travels in the duct and subsequently is mixed with a freestream of air in the vicinity of the actuated outlet door.

FIG. 2 is a cross-sectional, graphical representation of the location of the actuated outlet door 10 illustrated in FIG. 1, the actuated outlet door 10 being shown in an opened condition (or opened position). In particular, FIG. 2 provides a graphical representation of the location and disposition of the actuated outlet door 10, at least in this contemplated construction.

As illustrated in FIG. 2, the actuated outlet door 10 is opened such that it forms an angle 22 with the nacelle skin 24 defining the outlet opening 20. It is contemplated that the actuated outlet door 10 may be opened to any magnitude for the angle 22 as might be desired or required.

As noted, FIG. 2 illustrates the actuated outlet door 10 in an opened condition. This permits flow of heated air 26 (including hot exhaust, heated gases, combustion byproducts, or the like) created by the aircraft system 28 to exit through the outlet opening 20. In the discussion that follows, reference to heated air 26 is not intended to be limiting of the present invention. To the contrary, as indicated, reference to heated air 26 is intended to refer to hot exhaust, heated gases, combustion byproducts, etc.

The aircraft system 28 may encompass any of a number of systems on board the aircraft 12 that generate heat. Without limitation of the present invention, the aircraft system 28 may be an aircraft's heating, ventilation, and air conditioning ("HVAC") system, a precooler system, an alternate current motor-driven pump ("ACMP") system, an auxiliary power unit ("APU"), or any other system that may need to exhaust heated air (or other gases). The heated air 26 is exhausted overboard from the aircraft system 28 through the exhaust duct 30.

As may be appreciated from FIG. 2, the actuated outlet door 10 is contemplated to be opened to a degree permitting appropriate mixing of the heated air 26 with freestream air 32 that meets the flow requirements of the aircraft system 28. The degree of opening is such that it allows required mass flow to pass through system 28. Further details concerning this operation are provided in connection with FIGS. 19-22, which are discussed below.

During flight, it is contemplated that the demand for (or generation of) heated air 26 from the aircraft system 28 onboard the aircraft 12 will change. For example, an aircraft engine pre-cooler typically is used to cool down the bleed air that may be used by the wing anti-ice system or the Environment Control System (ECS). The amount of bleed air demanded for these functions depends on, inter alia, the flight conditions, the engine settings, etc. As should be apparent, changes in demand for heated air 26 are contemplated to be a function of the requirements of the aircraft system 28, among other variables. The demand for heated air 26 may also be dependent on ambient air conditions.

An aircraft engine precooler 210, which is discussed in connection with FIG. 23, illustrates one contemplated aircraft system 28. Without limiting the present invention, the aircraft engine precooler 210 generates heated air 26 during its operation, as discussed below in connection with FIG. 23.

As illustrated in FIG. 2, a control system, depicted graphically as a controller 34, connects, via communication line 36, to an actuator (not shown). The actuator, in turn, connects to the actuated outlet door 10 via a linkage 38. The actuated outlet door 10 connects to the aircraft 12 via the linkage 38. The linkage 38 may be of any type, including a simple hinge. The linkage 38 permits the actuated outlet door 10 to transition to any angular position between the fully closed condition and the fully opened condition. The present invention is intended to encompass any type of linkage 38 to connect the actuated outlet door 10 to the aircraft 12. As such, the present invention is not intended to be limited to any particular type of linkage 38 or construction for the linkage 38. The controller 34 opens or closes the actuated outlet door 10 depending upon the operating requirements of the aircraft system 28.

It is noted that there are several mechanisms that may be employed to open and/or close the actuated outlet door 10, upon the occurrence of circumstances that require opening or closing of the actuated outlet door 10. Mechanisms include, but are not limited to, mechanical, fuel, electrical, electro-mechanical, hydraulic, etc. The exact mechanism employed to open and close the actuated outlet door 10 is not critical to the present invention.

The actuated outlet door 10 can be anywhere between a simple two-position door to a fully modulated door that may accommodate an infinite number of positions within a specified range of opening. The degree to which the actuated outlet door 10 is opened alters the backpressure seen by the exhaust duct 30, thus varying the driving factor that pulls required mass flow through the aircraft system 28. The degree to which the actuated outlet door 10 is opened also varies the degree of mixing between the heated air 26 and the freestream air 32.

It is noted that the actuated outlet door 10 need not be positioned exactly where indicated in FIG. 1 or 2. The actuated outlet door 10 may be located elsewhere without departing from the scope of the present invention.

In addition, while one actuated outlet door 10 is illustrated, it is contemplated that several actuated outlet doors 10 may be employed together, without departing from the scope of the present invention.

With renewed reference to FIG. 2, it is noted that the actuated outlet door 10 may be provided with an aerodynamic shape. The aerodynamic shape is contemplated to assist with air flow across its outer surface 40 and its inner surface 42. The aerodynamic shape may be employed with any of the embodiments described herein.

Figure 3:
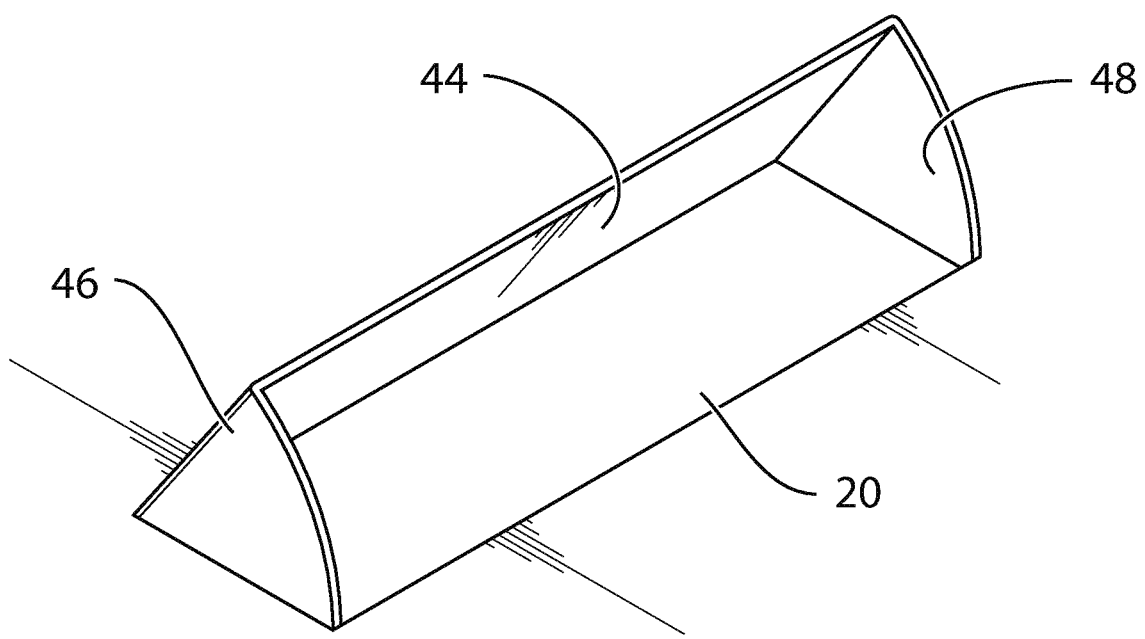
FIG. 3 is a perspective illustration of a second embodiment of a contemplated construction for an actuated outlet door according to the present invention.

FIG. 3 is a simple, perspective illustration of an actuated outlet door 44 according to a second embodiment of the present invention. In this embodiment, the actuated outlet door 44 includes a first side panel 46 and a second side panel 48. The side panels 46, 48 are contemplated, in selected constructions, to improve the aerodynamic properties of the actuated outlet door 44 by discouraging freestream air 32 from flowing around the side edges of the actuated outlet door 44.

Figure 4:
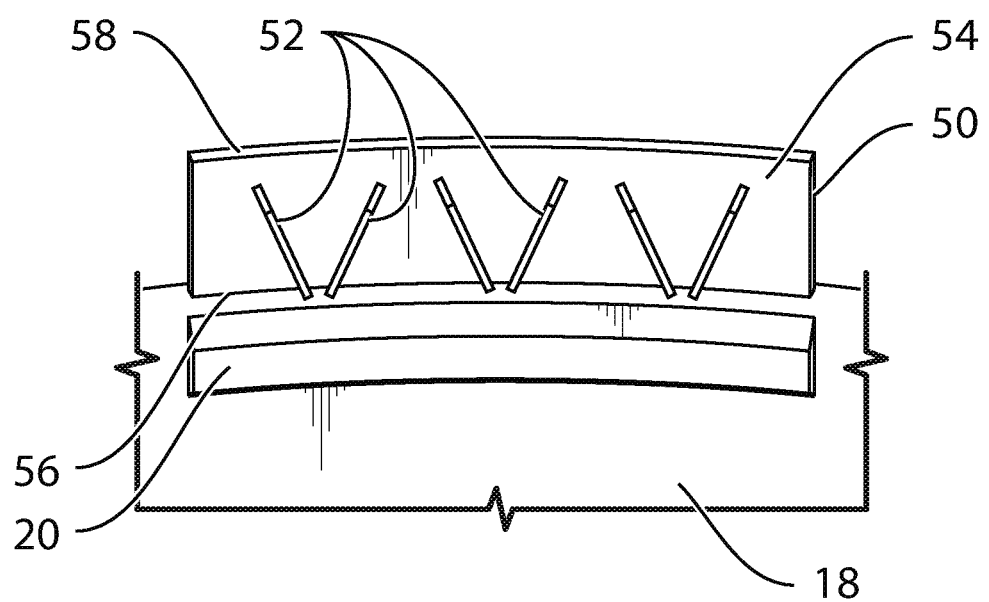
FIG. 4 is a perspective illustration of a third embodiment of a contemplated construction for an actuated outlet door according to the present invention.

FIG. 4 is a perspective, graphical illustration of a third embodiment of an actuated outlet door 50 of the present invention, shown in an opened condition.

The actuated outlet door 50 includes a number of vortex generators 52 on its inner surface 54. The vortex generators 52 are intended to be illustrative of how the inner surface 54 of the actuated outlet door 50 might be altered to change the mixing between the heated air 26 and the freestream air 32.

In FIG. 4, the vortex generators 52 are positioned closer to the leading edge 56 of the actuated outlet door 50 than the trailing edge 58. While the vortex generators 52 are illustrated near to the leading edge 56 of the actuated outlet door 50, the vortex generators 52 are contemplated to be positioned at any location and/or position on the inner surface 54 of the actuated outlet door 50, between the leading edge 56 and the trailing edge 58. It is noted that the leading edge 56 is positioned toward the front of the aircraft 12 and the trailing edge 58 is positioned toward the rear of the aircraft 12.

Figure 5:
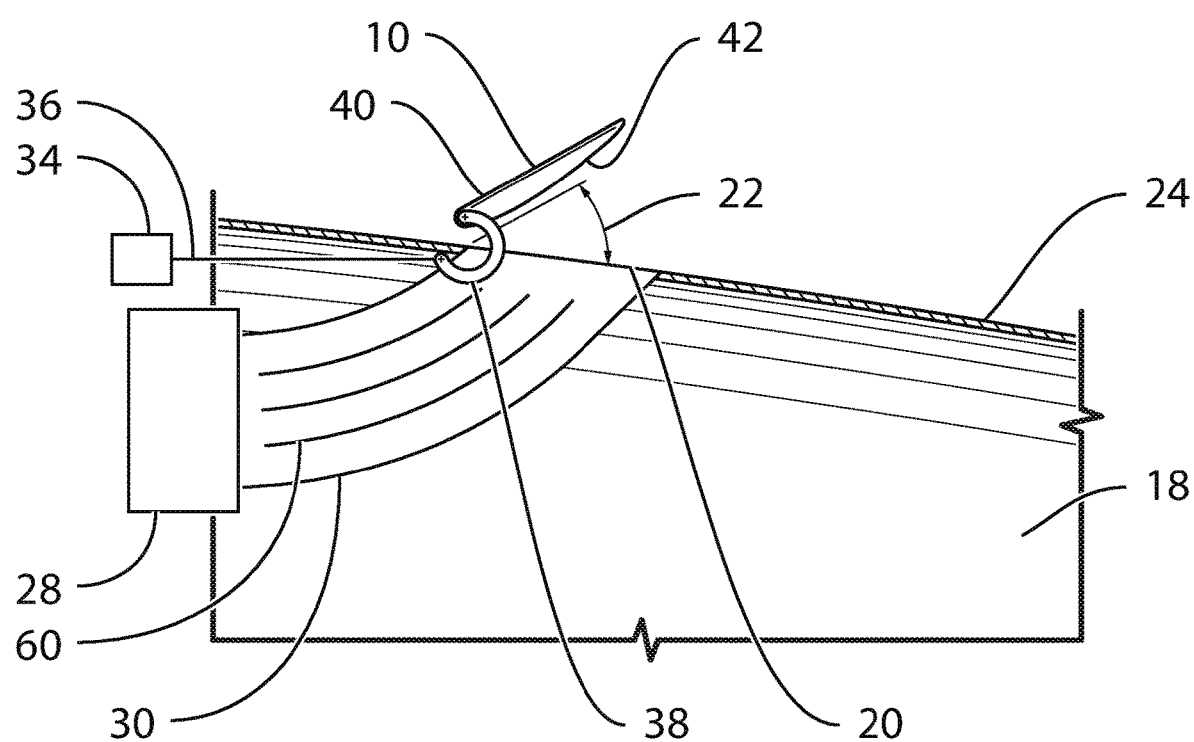
FIG. 5 is a graphical illustration showing details regarding a fourth embodiment of the present invention, where vanes are positioned within the duct to guide the flow of heated air.

FIG. 5 is a cross-sectional, graphical illustration of a fourth embodiment of the present invention. In this embodiment, one or more exhaust vanes 60 are positioned within the exhaust duct 30. The exhaust vanes 60 help to change flow direction of the heated air 26 as it passes through the exhaust duct 30 and exits through the outlet opening 20. In this embodiment, the actuated outlet door 10 is configured in the same (or similar) manner as the actuated outlet door 10 shown in FIG. 1. As should be apparent, however, any embodiment for the actuated outlet door 10 may be employed without departing from the scope of the present invention.

Figure 6:
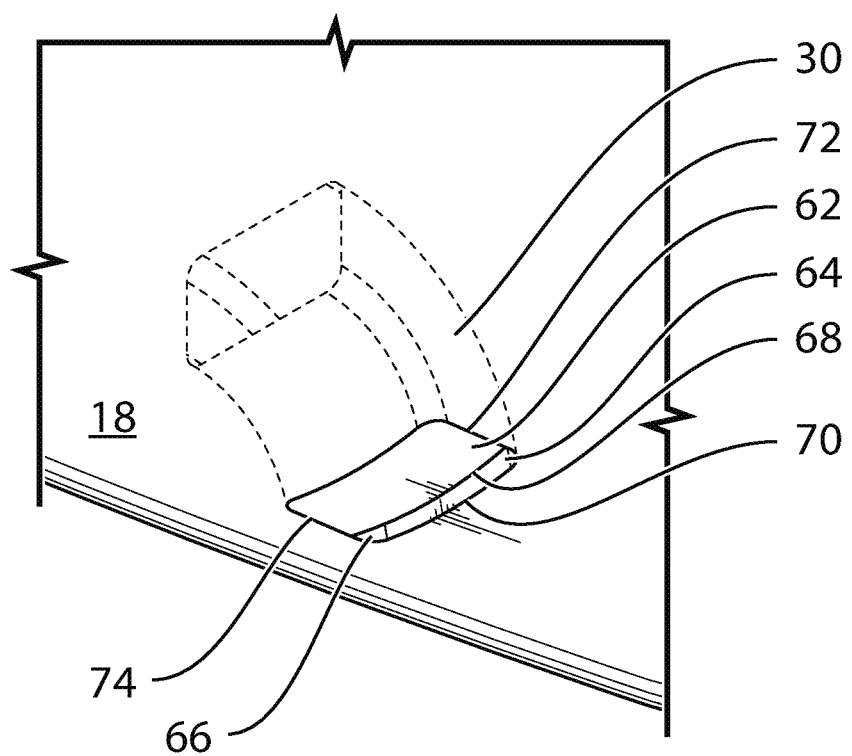
FIG. 6 is a perspective illustration of a fifth embodiment of a contemplated construction for an actuated outlet door according to the present invention, showing the actuated outlet door in a closed condition.

FIG. 6 is a perspective illustration of a fifth embodiment of an actuated outlet door 62 according to the present invention. In this embodiment, the actuated outlet door 62 does not fully occupy the outlet opening 64 when the actuated outlet door 62 is in the closed position, as illustrated. As a result, the actuated outlet door 62 forms a singular opening or gap 66 between the trailing edge 68 of the actuated outlet door 62 and the trailing edge 70 of the outlet opening 64. The gap 66 extends between the side edges 72, 74 of the actuated outlet door 62. The gap 66 establishes a permanent opening from the exhaust duct 30 to allow the heated air 26 to be exhausted in most flight conditions.

Figure 7:
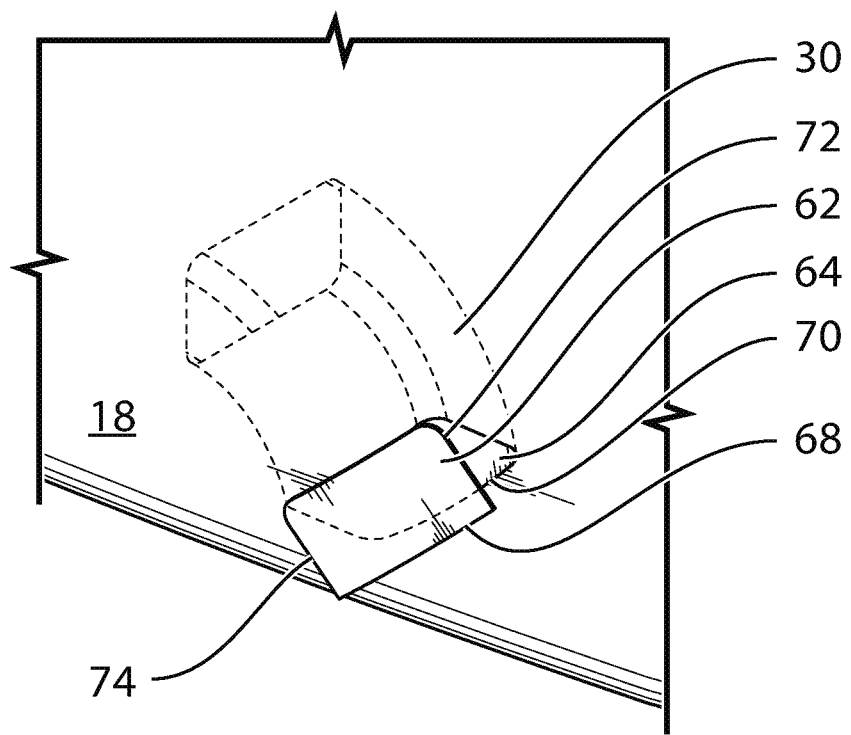
FIG. 7 is a perspective illustration of the fifth embodiment of the actuated outlet door shown in FIG. 6, with the actuated outlet door in an opened condition.

FIG. 7 illustrates the actuated outlet door 62 shown in FIG. 6 in an opened condition.

Figure 8:
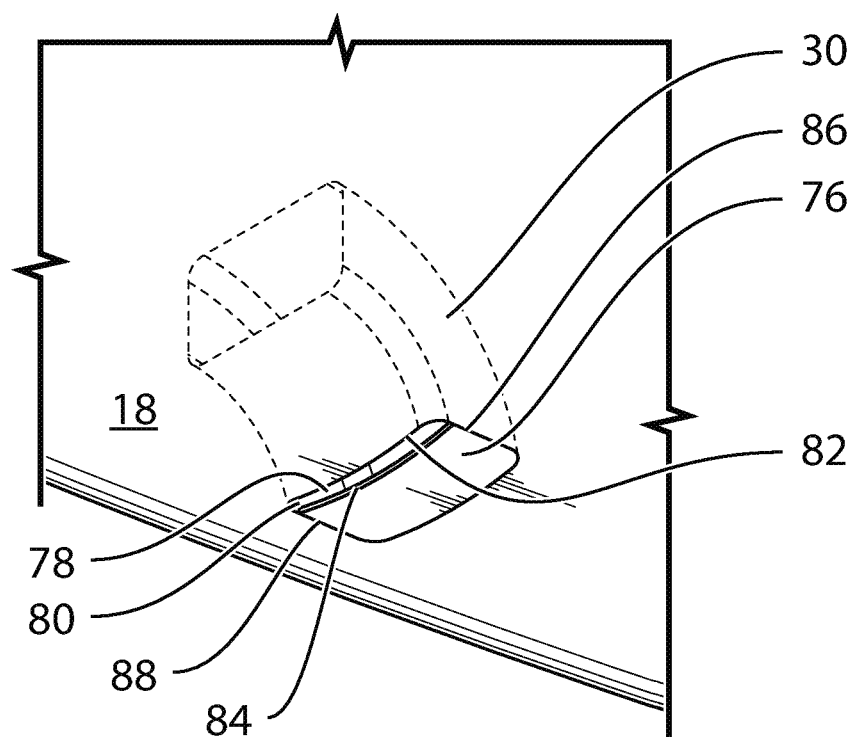
FIG. 8 is a perspective illustration of a sixth embodiment of a contemplated construction for an actuated outlet door according to the present invention, with the actuated outlet door being shown in a closed condition.

FIG. 8 is a perspective illustration of an actuated outlet door 76 according to a sixth embodiment of the present invention. Like the previous example, the actuated outlet door 76 does not fully occupy the outlet opening 78. In this embodiment, a gap 80 is established between the leading edge 82 of the outlet opening 78 and the leading edge 84 of the actuated outlet door 76. As in the prior example, the gap 80 extends between the side edges 86, 88 of the actuated outlet door 76.

Figure 9:
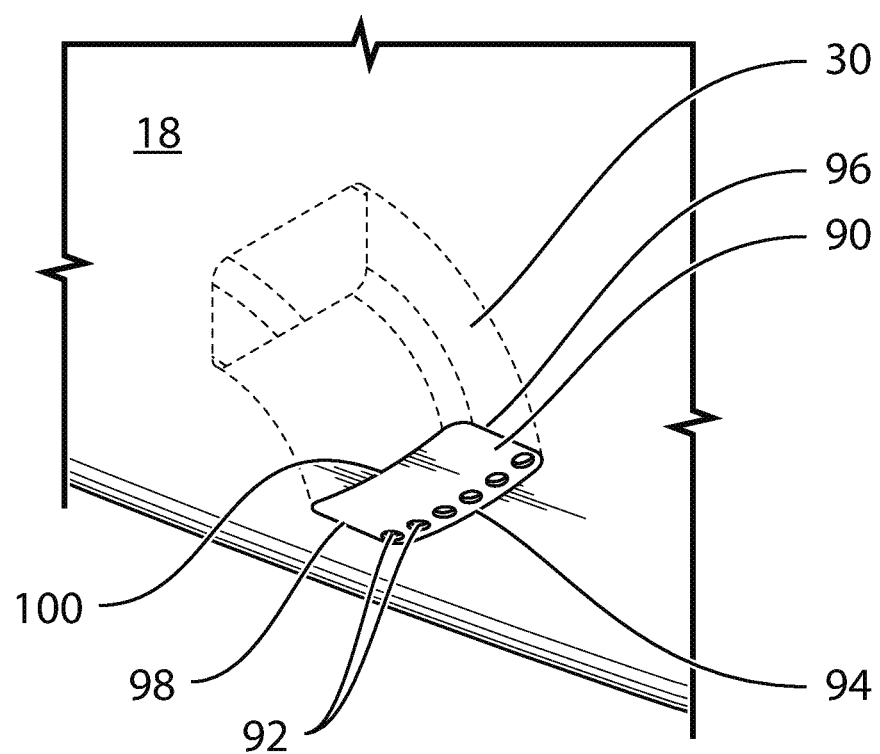
FIG. 9 is a perspective illustration of a seventh embodiment of a contemplated construction for an actuated outlet door according to the present invention, with the actuated outlet door being shown in a closed condition.

FIG. 9 is a perspective illustration of an actuated outlet door 90 according to a seventh embodiment of the present invention. The actuated outlet door 90 includes six openings 92 disposed along the trailing edge 94 between the side edges 96, 98 of the actuated outlet door 90. It is contemplated that the openings 92 may be positioned closer to the leading edge 100 without departing from the scope of the present invention. While six (6) openings 92 are illustrated, it is contemplated that the number of openings 92 may vary without departing from the scope of the present invention.

Figure 10:
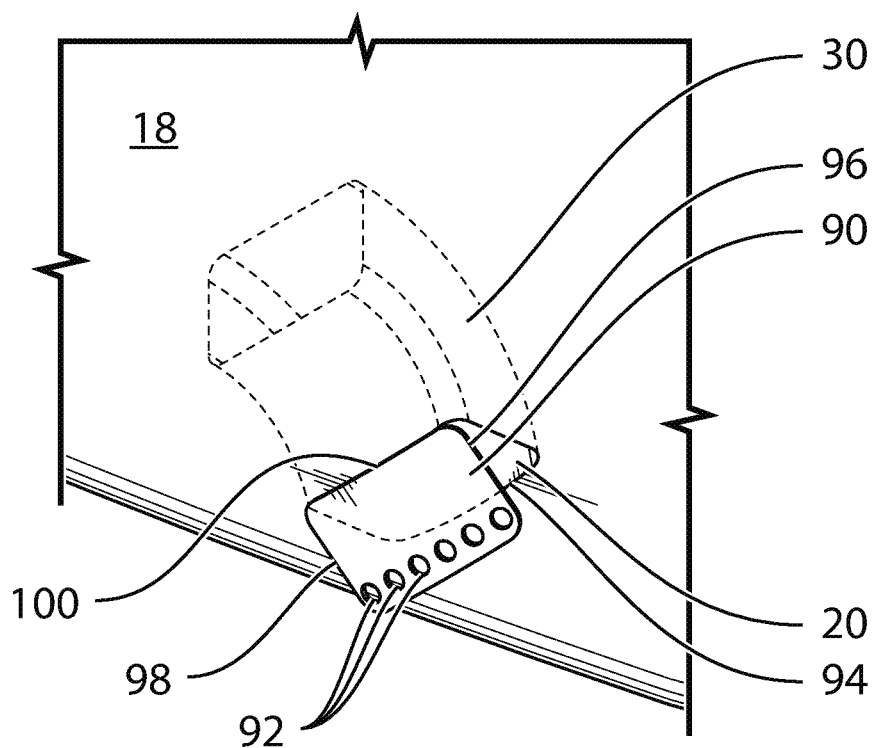
FIG. 10 is a perspective illustration of the seventh embodiment of the construction for the actuated outlet door shown in FIG. 9, with the actuated outlet door being shown in an opened condition.

FIG. 10 illustrates the actuated outlet door 90 shown in FIG. 9 in an opened position.

Figure 11:
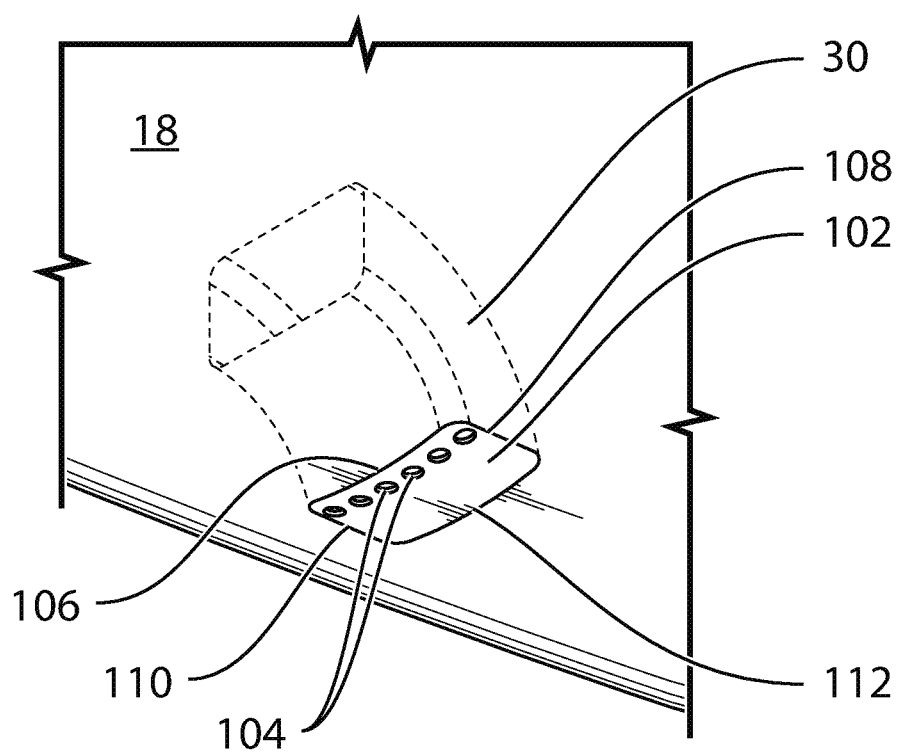
FIG. 11 is a perspective illustration of an eighth embodiment of a contemplated construction for an actuated outlet door according to the present invention, with the actuated outlet door being shown in a closed position.

FIG. 11 is a perspective illustration of an actuated outlet door 102 according to an eighth embodiment of the present invention. The actuated outlet door 102 includes six openings 104 disposed along the leading edge 106 between the side edges 108, 110 of the actuated outlet door 102. It is contemplated that the openings 104 may be positioned closer to the trailing edge 112 without departing from the scope of the present invention. While six (6) openings 104 are illustrated, it is contemplated that the number of openings 104 may vary without departing from the scope of the present invention.

Figure 12:
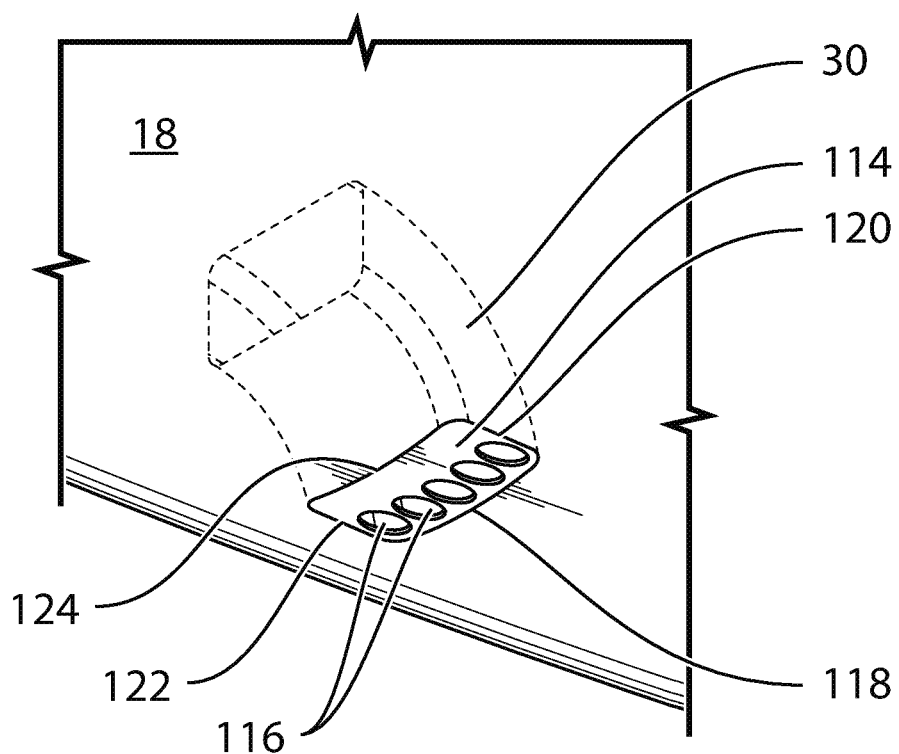
FIG. 12 is a perspective illustration of a ninth embodiment of a contemplated construction for an actuated outlet door according to the present invention.

FIG. 12 is a perspective illustration of a ninth embodiment of the present invention. In this illustration, the actuated outlet door 114 includes five (5) oblong openings 116 spaced adjacent to the trailing edge 118. In the illustrated embodiment, the oblong openings 116 are positioned adjacent to the trailing edge 118 of the actuated outlet door 116 between the side edges 120, 122. As before, it is contemplated that the oblong openings 116 may be disposed at any location between the leading edge 124 and the trailing edge 118 without departing from the scope of the present invention. It is contemplated that the number of oblong openings 116 may vary without departing from the scope of the present invention.

Figure 13:
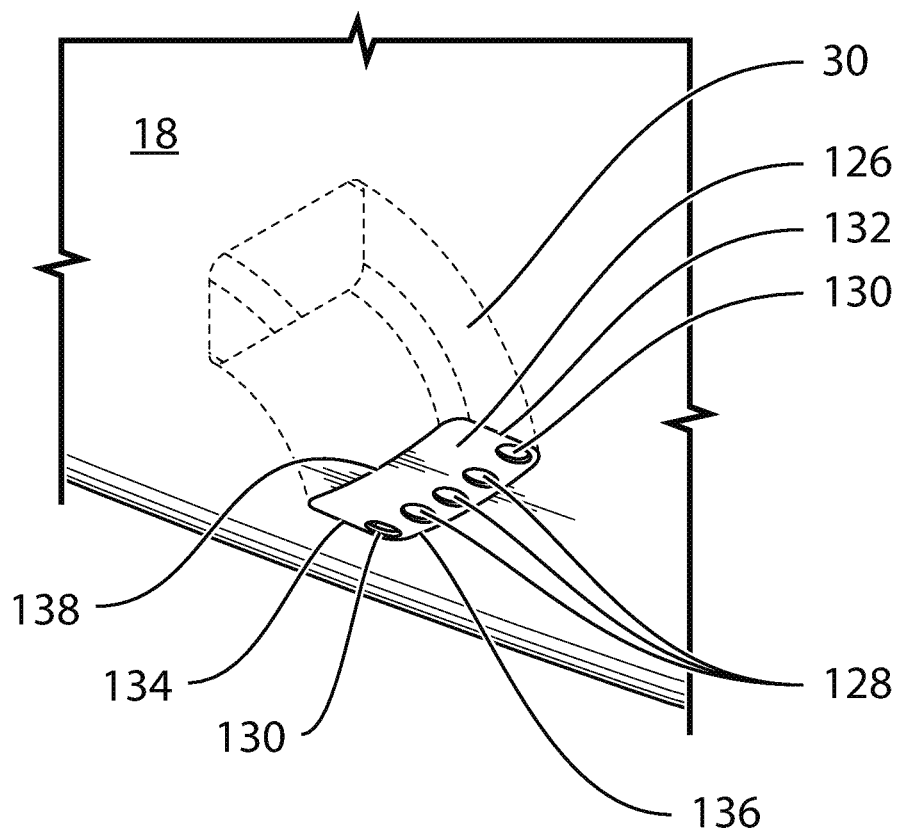
FIG. 13 is a perspective illustration of a tenth embodiment of a contemplated construction for an actuated outlet door according to the present invention.

FIG. 13 illustrates a tenth embodiment of the present invention. Here, the actuated outlet door 126 includes five oblong openings 128, 130. Three (3) larger oblong openings 128 are centrally located with two (2) smaller oblong openings 130 flanking the larger openings 128 adjacent to the side edges 132, 134 of the actuated outlet door 126. As in prior embodiments, the openings 128, 130 are adjacent to the trailing edge 136 of the actuated outlet door 126. Also consistent with other embodiments, the openings 128, 130 may be moved to locations closer to the leading edge 138 without departing from the scope of the present invention.

With respect to FIG. 13, one aspect of this embodiment of the present invention lies in difference in the sizes of the openings 128, 130. It is noted that the openings 128, 130 need not be of the same size to practice the present invention. As should be apparent from this embodiment, the present invention is not limited to any particular size or shape of the openings 128, 130. To the contrary, each of the openings 128, 130 may have different sizes and shapes (e.g., elongated slots) without departing from the present invention.

Figure 14:
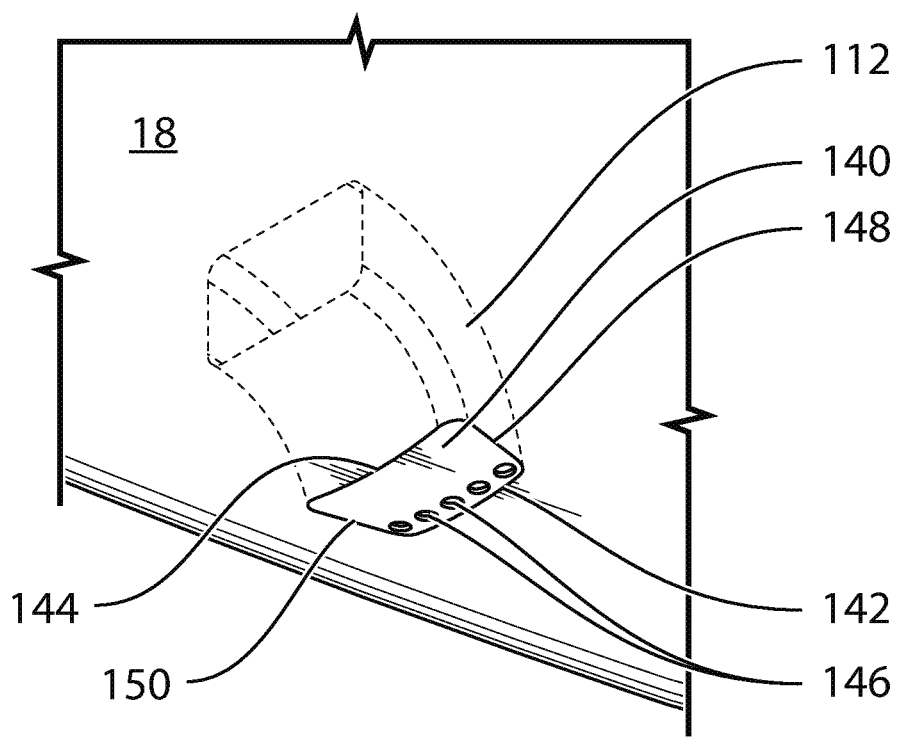
FIG. 14 is a perspective illustration of an eleventh embodiment of a contemplated construction for an actuated outlet door according to the present invention.

FIG. 14 is a perspective illustration of an eleventh embodiment of the present invention. In this embodiment, the actuated outlet door 140 is trapezoidally shaped. While it is considered a suitable approach to have the narrower side of the actuated outlet door 140 be defined by the trailing edge 142, it is contemplated that the narrower edge may be the leading edge 144 of the actuated outlet door 140 without departing from the scope of the present invention. In this embodiment, five (5) circular openings 146 are positioned between the side edges 148, 150 of the actuated outlet door 140. As mentioned above, the openings 146 may be arranged in any other pattern without departing from the scope of the present invention.

Figure 15:
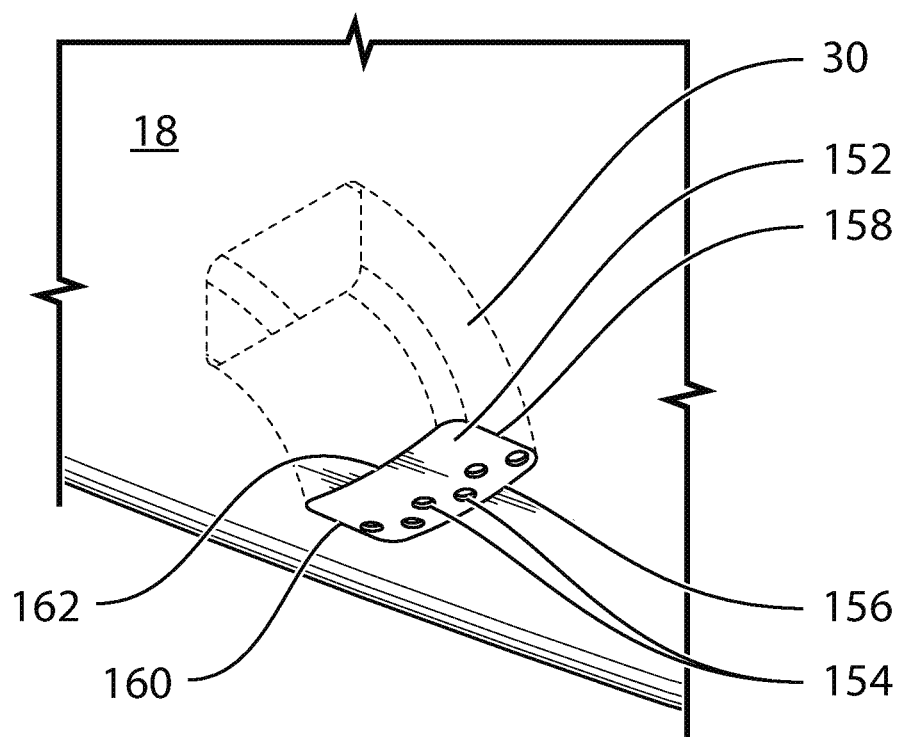
FIG. 15 is a perspective illustration of a twelfth embodiment of a contemplated construction for an actuated outlet door according to the present invention.

FIG. 15 is a perspective illustration of a twelfth embodiment of an actuated outlet door 152 according to the present invention. Here, the actuated outlet door 152 includes a plurality of staggered, circular openings 154 disposed adjacent to the trailing edge 156 of the actuated outlet door 152. The openings 154 are staggered between the side edges 158, 160 of the actuated outlet door 152. As before, the openings 154 may be positioned closed to the leading edge 162 of the actuated outlet door 152 without departing from the scope of the present invention.

Figure 16:
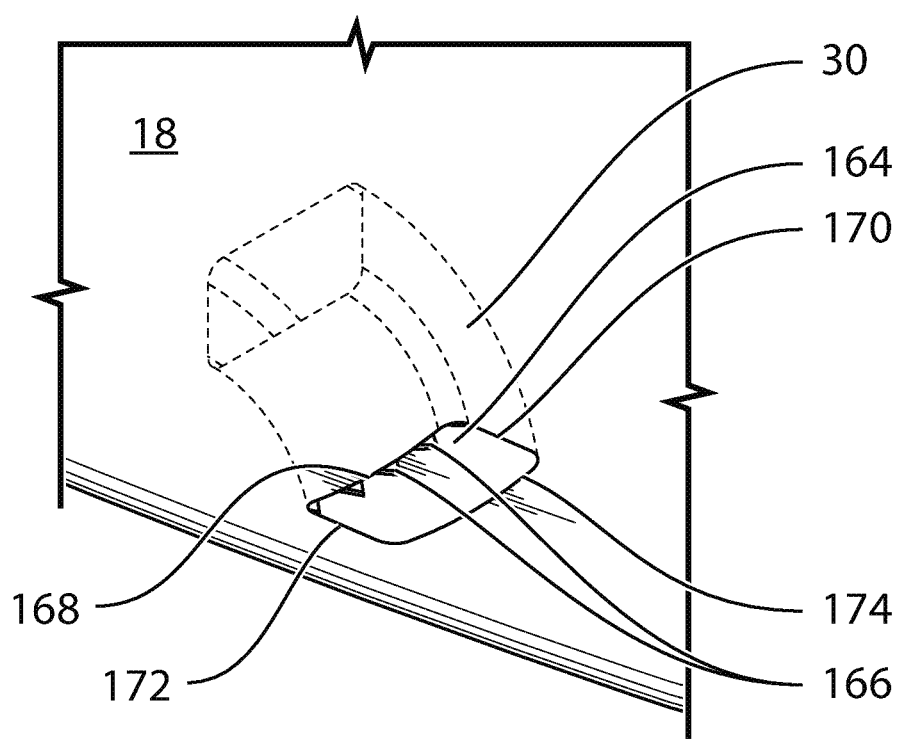
FIG. 16 is a perspective illustration of a thirteenth embodiment of a contemplated construction for an actuated outlet door according to the present invention.

FIG. 16 is a perspective illustration of a thirteenth embodiment of an actuated outlet door 164. In this embodiment, several triangularly-shaped notches 166 are disposed along the leading edge 168 of the actuated outlet door 164 between the side edges 170, 172. The notches 166 may be made longer in dimensions without departing from the scope of the present invention. In particular, the apexes of the notches 166 may extend closer to the trailing edge 174 than the notches 166 illustrated in FIG. 16. The notches 166 also may be disposed at the trailing edge 174.

Figure 17:
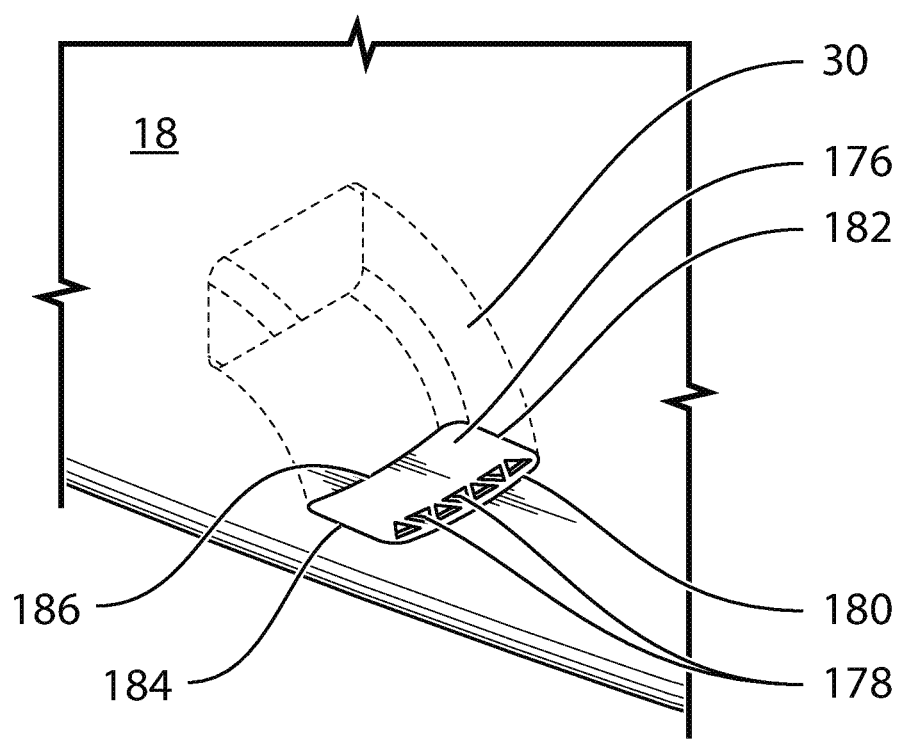
FIG. 17 is a perspective illustration of a fourteenth embodiment of a contemplated construction for an actuated outlet door according to the present invention.

FIG. 17 is a perspective illustration of a fourteenth embodiment of an actuated outlet door 176 according to the present invention. In this embodiment, a plurality of triangular openings 178 are disposed adjacent to the trailing edge 180 of the actuated outlet door 176 between the side edges 182, 184. As with other embodiments, the openings 178 may be positioned closer to the leading edge 186 without departing from the scope of the present invention.

Figure 18:
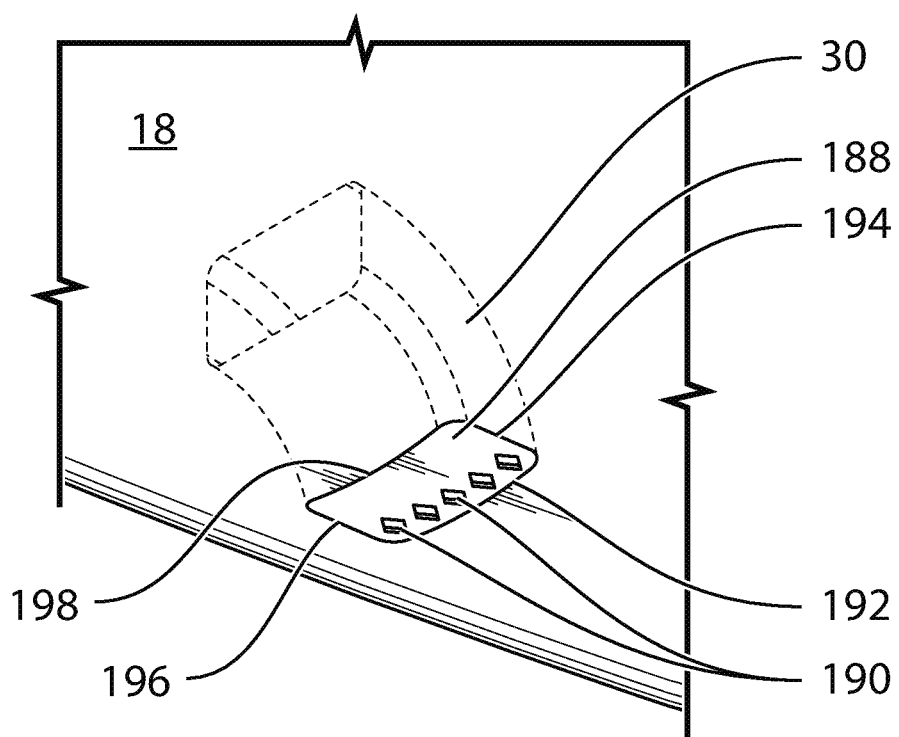
FIG. 18 is a perspective illustration of a fifteenth embodiment of a contemplated construction for an actuated outlet door according to the present invention.

FIG. 18 is a perspective illustration of a fifteenth embodiment of an actuated outlet door 188 according to the present invention. The openings 190 are diamond-shaped and are disposed adjacent to the trailing edge 192 between the side edges 194, 196. As before, the openings 190 may be disposed closer to the leading edge 198 without departing from the scope of the present invention.

Figure 19:
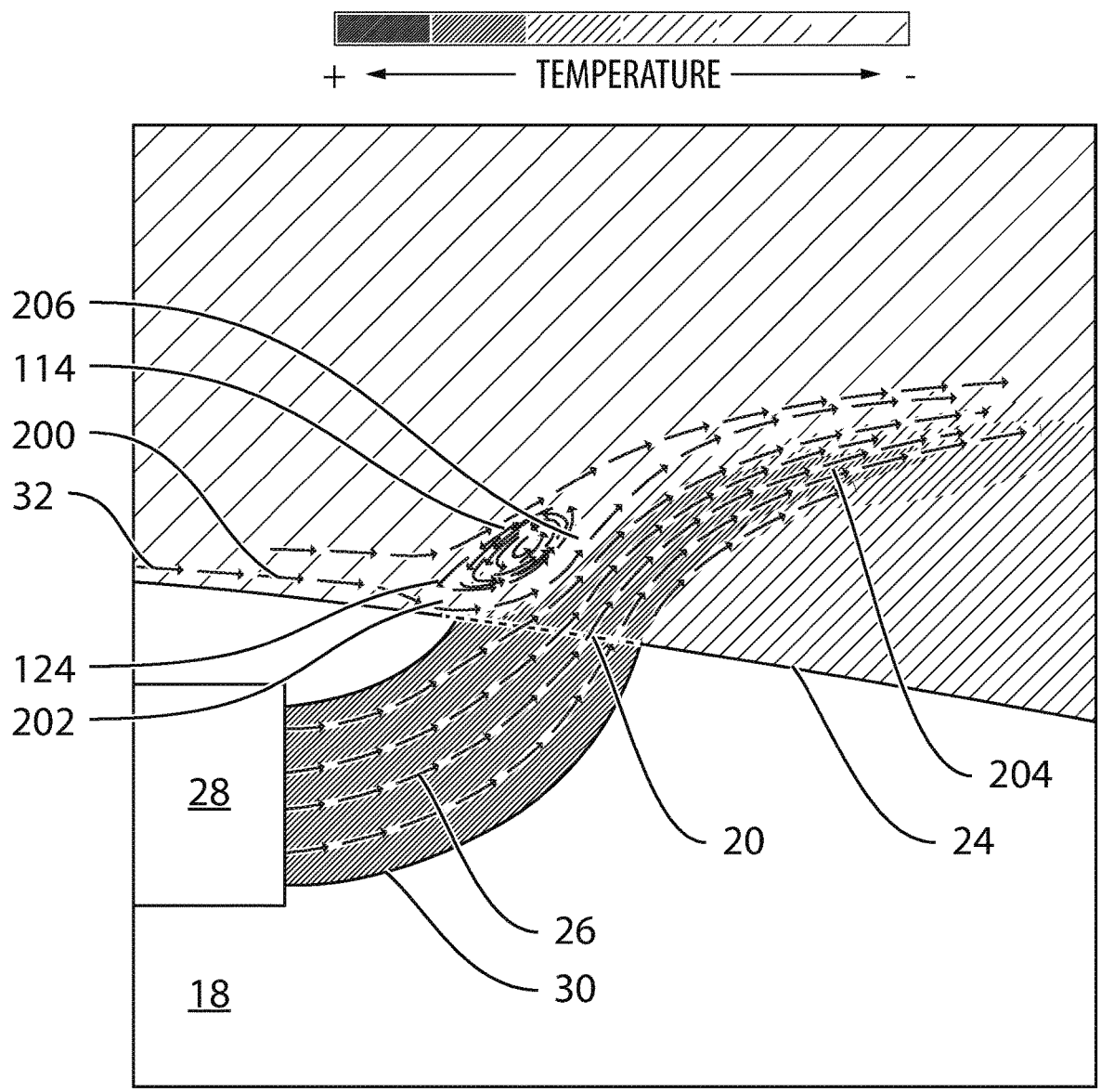
FIG. 19 is a graphical, cross-sectional illustration of a temperature profile and streamlines for an actuated outlet door, such as the one illustrated in FIG. 12, showing the flow of heated air from the duct when the actuated outlet door is in an opened condition.

FIG. 19 is a graphical, cross-sectional, side view of the actuated outlet door 114 shown in FIG. 12. The actuated outlet door 114 is in the opened condition in this illustration.

As shown in FIG. 19, a small portion 200 of the freestream air 32 mixes with the heated air 26 by passing through a small separation 202 between the actuated outlet door 114 and the nacelle skin 24. The separation 202 allows mixing between the heated air 26 and the cooler, freestream air 32. The mixed air 204 is then cooler than the heated air 26.

FIG. 19 illustrates how the actuated outlet door 114 changes the flow of air in its vicinity. In particular, when the actuated outlet door 114 is in an opened condition, an area of low pressure 206 is created behind the actuated outlet door 114, largely due to the angle 22 of the actuated outlet door 10. The area of low pressure 206 pulls the heated air 26 through the outlet opening 20.

As noted, the small portion 200 of the freestream air 32 mixes with the heated air 26. This has the effect of lowering the temperature of the mixed air 204. Since it is the mixed air 204 that is likely to transfer heat to the nacelle skin 24, the reduced temperature of the mixed air 204 helps to lower the temperature of the nacelle skin 24 by comparison with aircraft 12 that do not include the actuated outlet door 114 having this feature.

Concerning the separation 202, the separation 202 is established between the leading edge 124 of the actuated outlet door 114 and the nacelle skin 24. The separation 202 may be of any size, shape, or dimension as required or as desired. It is contemplated that the separation 202 may be of variable size depending on the type of linkage 38 employed.

Figure 20:
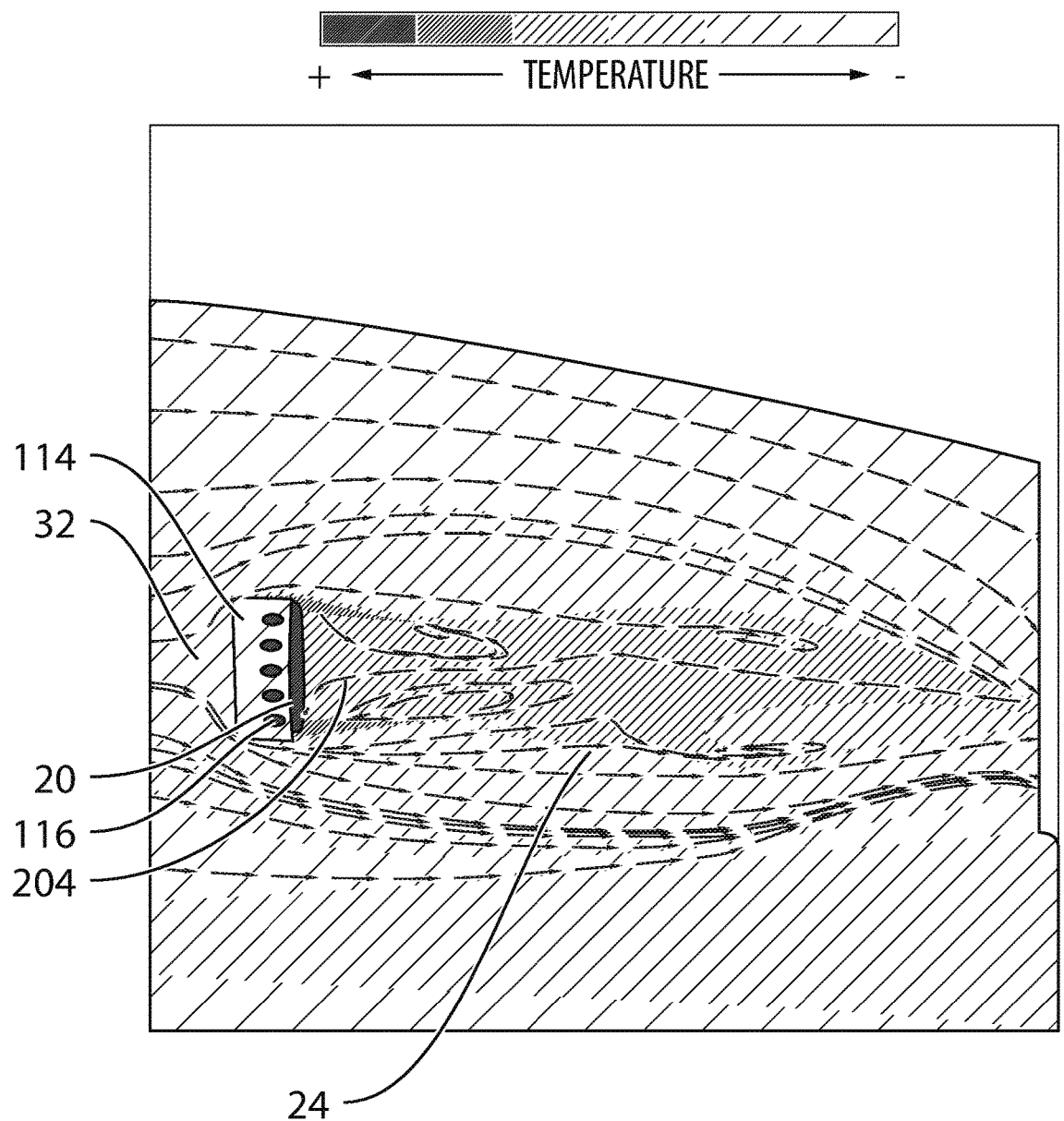
FIG. 20 is a graphical illustration of the exterior of the actuated outlet door illustrated in FIG. 19, showing the air flow when the actuated outlet door is in the opened condition.

FIG. 20 is an exterior view of the actuated outlet door 114, showing the actuated outlet door 114 in the opened position. The heated air 26 from the aircraft system 28 exits through the exhaust duct 30 through the outlet opening 20. The heated air 26 mixes with the cooler, small portion 200 of freestream air 32. The mixed air 204 is then cooler than the heated air 26.

FIG. 21 is a graphical, cross-section of the embodiment of the present invention illustrated in FIGS. 19 and 20. In this illustration, the actuated outlet door 114 is in the closed condition. As a result, heated air 26 exits through the openings 116 in the actuated outlet door 114 to mix with the freestream air 32 and create the mixed air 204.

FIG. 22 is an exterior view of the actuated outlet door 114 shown in FIG. 21. In this illustration, the actuated outlet door 114 is shown in the closed condition.

In connection with the present invention, there are similarities between the various embodiments that are described above. First, the outlet opening 20 defines an area in the nacelle 18 through which the heated air 26 is to be exhausted. The actuated outlet door 10, 44, 50, 62, 76, 90, 102, 114, 126, 140, 152, 164, 176, 188 (hereinafter referred to as "the actuated outlet door 114" for simplicity—but intended to refer to all of the embodiments described herein, including any variants) defines openings 66, 80, 92, 104, 116, 128, 130, 146, 154, 166, 178, 190 (hereinafter referred to as "the openings 116" for simplicity—but intended to refer to all of the embodiments and any variants thereof). The openings 116 define an open area that is a predetermine percentage of the outlet opening 20.

In connection with the design and construction of the various embodiments of the actuated outlet door 114 of the present invention, it is noted that there are three primary variables that are taken into account: (1) drag, (2) skin temperature (i.e., the temperature of the surface of the nacelle skin 24), and (3) back pressure. These three variables are balanced against one another to establish the size of the separation 202, the areas of the openings 116, and the degree to which the actuated outlet door 114 is opened through the angle 22, the outlet opening 20, and/or the shape of the actuated outlet door 114.

It is also contemplated in some embodiments that the separation 202, when the actuated outlet door 114 is in the open condition, is less than or equal to 25% of the length of the outlet opening 20 in the streamwise direction. In alternative embodiments, the separation 202 may be at least one of less than or equal to 20%, 15%, 10%, or 5% of the length of the outlet opening 20 in the streamwise direction. In other words, as noted above, it is contemplated that the separation 202 will be sized for the aircraft 12 incorporating the actuated outlet door 114 according to the present invention.

Drag is a variable familiar to those skilled in the art. Drag is the resistive force felt by an object in the opposite direction of its relative movement to the surrounding fluid. Drag is a variable that is to be kept to a minimum in most flight conditions, as should be apparent to those skilled in the art.

Since drag is to be kept to a minimum in most flight conditions, it is preferable to keep the actuated outlet door 114 in a closed condition during the majority of the operation of the actuated outlet door 114. As such, providing a gap and/or the openings 116 is a suitable approach to the construction of the actuated outlet door 114 because a low massflow can still be expelled while the actuated outlet door 114 remains closed for most of the operation thereof. This way, there is no protrusion from the nacelle skin 24 that might disturb the flow and cause significant drag impact.

Skin temperature refers to the temperature of the nacelle skin 24 downstream of the actuated outlet door 114. The skin temperature is of concern to engineers as mechanical properties of any material are degraded at high temperature. Moreover, there is an associated safety concern. Specifically, there is a desire to keep the skin temperature of the nacelle skin 24 downstream of the actuated outlet door 114 below a given maximum operating limit that is a function of the material of the nacelle skin 24 and the paint used.

It is understood that the difference between the heated air 26 flow pressure at the exit of the aircraft system 28 and the back pressure seen by the exhaust duct 30 is the driving factor to pull required mass flow through aircraft system 28 and therefore, to ensure an efficient operation of aircraft system 28. Therefore, those skilled in the art would understand that the backpressure is a key parameter in an exhaust design given the operational requirements of the aircraft system 28.

As noted, drag, skin temperature, and backpressure are contemplated to be maintained within predetermined ranges for operation of the aircraft and the associated aircraft system 28. The exact ranges are contemplated to differ from aircraft to aircraft, depending on, for example, the desired aircraft performance, the flight envelope of the aircraft, the properties of the flow to be expelled (pressure, temperature, massflow), the material of the nacelle skin 24, etc.

As noted above, the total area of openings 116, in some embodiments, is contemplated to be about 10-20% of the outlet opening 20. In one contemplated embodiment, the open area is defined as about 12-18% of the outlet opening 20. More specifically, the open area may be about 14-16% of the area of the outlet opening 20. Even more specifically, the open area may be about 15% of the area of the outlet opening 20.

As noted above, the actuated outlet door 114 may be opened within a range of angles 22. It is contemplated that the actuated outlet door 114 may be opened to a maximum angle 22 of about 60°. In other embodiments, the maximum angle 22 is at least one of 55°. 50°, 45°, 40°, 35°, 30°, 25°, or 20°.

Concerning the exhaust duct 30, it is contemplated that the exhaust duct 30 may include one or more features to guide the flow of the heated air 26 passing therethrough. For example, the exhaust duct 30 may include vanes 60 or other structures to guide the flow of the heated air 26 therethrough. Vortex generators also may be used.

In connection with the embodiment illustrated in FIG. 14, it is noted that, with respect to any embodiment described herein, the openings 116 may have any shape including, but not limited to circular, oval, square, rectangular, triangular polygonal amorphous, transverse slots, longitudinal slots, etc. In addition, the openings 116 may be located and/or positioned anywhere in the actuated outlet door 114 without departing from the scope of the present invention. Moreover, as discussed, any number of openings 116 may be incorporated in the actuated outlet door 114 without departing from the scope of the present invention.

In addition, it is noted that the design parameters for the temperature of the nacelle skin 24 are contemplated to vary depending upon the construction of the aircraft 12. For example, an nacelle skin 24 made from a metal alloy, such as aluminum, will present an nacelle skin 24 that is capable of withstanding higher temperatures than a nacelle skin 24 made from a composite material (i.e., a carbon fiber composite material).

With respect to the degree to which the actuated outlet door 114 is opened during operation, it is contemplated, in some embodiment, that the angle 22 is less than about 60 degrees. In other embodiments, the angle 22 is contemplated to be less than about 55 degrees. Still further, the angle 22 may be less than about 50, 45, 40, 35, 30, 25, 20, 15, 10, and/or 5 degrees, as required or as desired. As noted above, the actuated outlet door 114 may be positioned any of an infinite number of positions between the closed position (at 0 degrees) and the opened position (about 60 degrees).

FIG. 23 shows a schematic representation of a turbine engine 206 housed within a nacelle 18.

A stream of hot, compressed air (also referred to as hot bleed air) 208 is bled from the turbine engine 206. This hot bleed air 208, is sent to the hot air inlet of a precooler 210. The precooler 210 is a heat exchanger which serves to cool the stream of hot bleed air 208 with fan air 212, producing a stream of cooled hot bleed air which can be used, inter alia, in an aircraft's HVAC system and anti-icing system. The precooler 210 also generates heated air 26 that is discharged through the actuated outlet door 10.

With respect to the various embodiments discussed above, one or more of the features from the embodiments may be employed together without departing from the scope of the present invention.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. An aircraft component of an aircraft, comprising:
an outlet area defined in a skin of the aircraft component to exhaust a flow of heated air to an outside of the aircraft:
an outlet door comprising:
a body defining a door area and a leading edge and a trailing edge; and
a linkage connecting the body to the aircraft component and permitting the body to transition between an open position and a closed position;

wherein, in the closed position, the body at least partially occupies the outlet area, wherein, in the open position, the body forms an angle with the skin of the aircraft component, wherein the leading edge of the body and the skin of the aircraft component define a separation therebetween when the body is in the open position, and wherein when a sufficient freestream of air flows around the outlet area, the separation permits a flow of air from outside of the aircraft to mix with the flow of heated air, such that the body forms a low pressure zone that pulls the flow of heated air out of the outlet area when the body is in the open position, and wherein the low pressure zone forms downstream of the body.

2. The aircraft component of claim 1, wherein, when the sufficient freestream of air flows around the outlet area and when the body is in the open position, the body and the separation cooperate to pull the flow of heated air out of the outlet area and to mix the air from outside of the aircraft with the flow of heated air.

3. The aircraft component of claim 1, wherein when the sufficient freestream of air flows around the outlet area, the low pressure zone forms adjacent to a lower surface of the body.

4. The aircraft component of claim 1, wherein the linkage connects to the body rearward of the leading edge of the body.

5. The aircraft component of claim 1, further comprising:
at least one opening in the outlet area when the body is in the closed condition, wherein the at least one opening establishes an opening area,
wherein the opening area is less than the outlet area.

6. The aircraft component of claim 5, wherein the at least one opening is defined by a difference between the door area and the outlet area, such that a gap forming the at least one opening is established between the body and the outlet.

7. The aircraft component of claim 6, wherein the body further defines a first side edge, and a second side edge,
wherein the first side edge and the second side edge connect the leading edge to the trailing edge, and
wherein a distance between the leading edge and the aircraft component, when the body is in the open condition, is less than 25% of an average length of at least one of the first and second side edges.

8. The aircraft component of claim 5, wherein the at least one opening comprises a plurality of openings through the body.

9. The aircraft component of claim 8, wherein the plurality of openings have dissimilar sizes.

10. The aircraft component of claim 5, wherein a ratio of the opening area to the outlet area is about 10-20% of the outlet area.

11. The aircraft component of claim 1, wherein the angle to which the body is open with respect to the aircraft component is less than about 60 degrees.

12. The aircraft component of claim 1, further comprising a plurality of vortex generators on an interior surface of the body.

13. The aircraft component of claim 1, wherein the outlet area is a terminus of an exhaust duct including a plurality of vanes.

* * * * *